US012633712B2

(12) United States Patent
Kreischer et al.

(10) Patent No.: US 12,633,712 B2
(45) Date of Patent: May 19, 2026

(54) METHOD FOR INSPECTING THE QUALITY OF A CRIMP CONNECTION AND SYSTEM THEREFOR

(71) Applicant: TKR Spezialwerkzeuge GmbH, Gevelsberg (DE)

(72) Inventors: Torsten Kreischer, Wetter (DE); Thorsten Weyland, Herdecke (DE)

(73) Assignee: TKR Spezialwerkzeuge GmbH, Gevelsberg (DE)

( * ) Notice: Subject to any disclaimer, the term of this patent is extended or adjusted under 35 U.S.C. 154(b) by 404 days.

(21) Appl. No.: 18/494,914

(22) Filed: Oct. 26, 2023

(65) Prior Publication Data

US 2024/0142354 A1 May 2, 2024

(30) Foreign Application Priority Data

Oct. 28, 2022 (DE) ..................... 10 2022 128 652.5

(51) Int. Cl.
H01R 43/042 (2006.01)
B25F 5/00 (2006.01)
(Continued)

(52) U.S. Cl.
CPC ........... H01R 43/0421 (2013.01); G01N 3/08 (2013.01); B25F 5/00 (2013.01); H01R 43/0428 (2013.01);
(Continued)

(58) Field of Classification Search
CPC ............ H01R 43/0421; H01R 43/0486; H01R 43/0428; H01R 43/048; G01N 3/08; B25F 5/00
See application file for complete search history.

(56) References Cited

U.S. PATENT DOCUMENTS 4,924,709 A * 5/1990 Plyter ...................... G01N 3/08
73/830
9,985,404 B2 * 5/2018 Fries .................... H01R 43/052
(Continued)

FOREIGN PATENT DOCUMENTS

DE 29806179 U1 10/1998
EP 0460441 A1 12/1991
WO 2015179585 A1 11/2015

OTHER PUBLICATIONS

European Patent Application No. 23200139.6, Search Report (Jul. 12, 2024).
(Continued)

*Primary Examiner* — Jonathan M Dunlap
(74) *Attorney, Agent, or Firm* — ICE MILLER LLP; Justin D. Swindells

(57) ABSTRACT

The invention relates to a method for inspecting the quality of a crimp connection by means of a handheldable pulling and compressing device suitable for producing the crimp connection, as well as a handheldable pulling and compressing device and a system for carrying out the method. In order to provide a method for inspecting the quality of a crimp connection by means of a handheldable pulling and compressing device suitable for producing the crimp connection, as well as a handheldable pulling and compressing device and a system for carrying out the method, which enable the quality of the crimp connection to be determined in a simple and reliable manner, it is provided that a crimp holder is arranged on a punch holder for attaching a crimp contact of a crimp connection and a cable holder is arranged on a die holder for attaching a cable of the crimp connection, a handheldable pulling and compressing device. From a screw drive, a tensile force transmitted to the crimp contact through the crimp holder via a coupling unit is transmitted to the crimp connection. The tensile strength of the crimp
(Continued)

Figure 1:
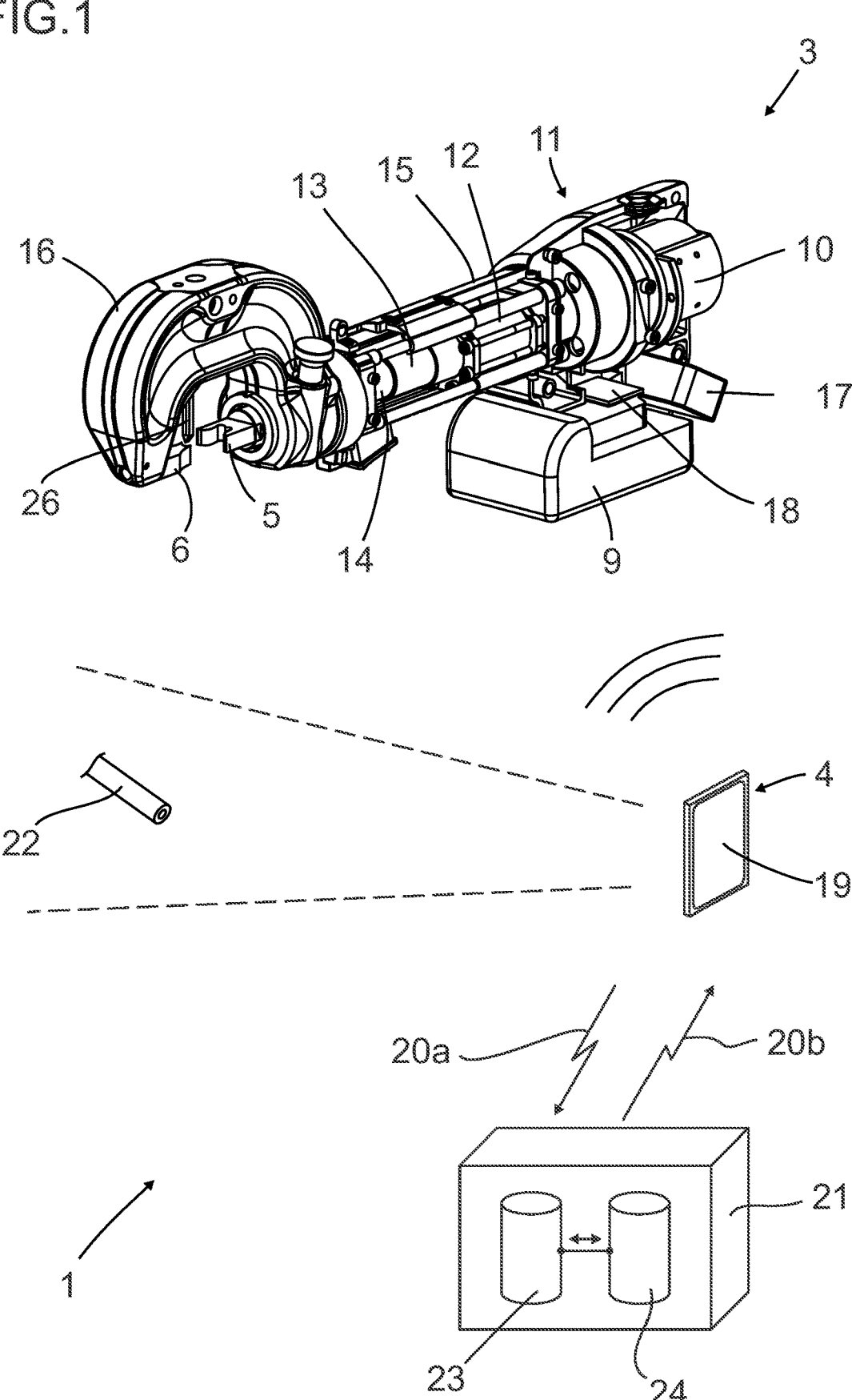

connection is determined by detecting the tensile force of the crimp holder and/or detecting the adjustment travel of the crimp holder by means of a sensor unit.

13 Claims, 2 Drawing Sheets

(51) Int. Cl.
  *G01N 3/08* (2006.01)
  *H01R 43/048* (2006.01)
(52) U.S. Cl.
  CPC ........ *H01R 43/048* (2013.01); *H01R 43/0486*
  (2013.01)

(56) References Cited

U.S. PATENT DOCUMENTS

2012/0137486 A1    6/2012 Charlton et al.
2015/0311659 A1 * 10/2015 Fries .................... H01R 43/052
                                                    29/863
2018/0264563 A1    9/2018 Frenken
2020/0106230 A1    4/2020 White et al.
2021/0397155 A1   12/2021 White

OTHER PUBLICATIONS

European Patent Application No. 23200139.6, Partial Search Report (Mar. 18, 2024).

* cited by examiner

METHOD FOR INSPECTING THE QUALITY OF A CRIMP CONNECTION AND SYSTEM THEREFOR

CROSS-REFERENCE TO RELATED APPLICATIONS

This application is a convention priority application which claims priority to German patent application 10 2022 128 652.5, filed Oct. 28, 2022, the disclosure of which is incorporated herein by reference in their entireties.

The invention relates to a method for inspecting the quality of a crimp connection by means of a handheldable pulling and compressing device suitable for producing the crimp connection, as well as a handheldable pulling and compressing device and a system for carrying out the method.

Crimp connections, i.e. connections made by attaching a crimp contact to a conductor with one or more strands, as well as stationary crimping machines or mobile crimping pliers for making the crimp connection are known from the prior art in a variety of designs. To ensure a good and secure connection of the crimp contact to the stranded wire, an inspection of the quality of the crimp connection is required.

To assess the quality of crimp connections, the pull-out force, i.e. the tensile strength of crimp connections, is determined in particular in addition to the crimp height, which is usually determined in laboratories. Knowledge of the pull-out force enables important conclusions to be drawn about the quality of the crimp connection independently of the crimp height and is usually determined by separate measuring tools and/or devices. At present, flexible and mobile inspection of the quality of crimp connections, for example in a motor vehicle workshop, is only possible to a limited extent and usually requires the crimp connection to be removed and transported to a stationary measuring device, so that known methods for inspecting the quality of crimp connections are cumbersome and cost-intensive.

Handheldable pulling and compressing devices that have a drive unit with an electric motor-driven screw drive are known, for example, as rivet and pressing devices from the prior art and are used, for example, in workshop operations, in particular in motor vehicle workshops, as part of repair work on the body of vehicles.

Starting from this, the invention is based on the object of providing a method for inspecting the quality of a crimp connection by means of a handheldable pulling and compressing device suitable for producing the crimp connection, as well as a handheldable pulling and compressing device and a system for carrying out the method, which enable the quality of the crimp connection to be determined in a simple and reliable manner.

The invention solves the problem by a method having the features of claim 1, a handheldable pulling and compressing device having the features of claim 10, and a system having the features of claim u. Advantageous further embodiments are given in the dependent claims.

The handheldable pulling and compressing device has a drive unit comprising a battery-operated electric motor and a screw drive which is arranged in a housing body and connected to the electric motor for transmitting pulling (tensile) and compressive forces resulting from the direction of rotation of the electric motor to a coupling unit. Furthermore, the handheldable pulling and compressing device has a punch holder connected to the coupling unit and a die holder arranged on the housing body, as well as a sensor unit for detecting the tensile and compressive forces and/or the adjustment travel of the punch holder.

In the method according to the invention for inspecting the quality of a crimp connection by means of a handheldable pulling and compressing device suitable for producing the crimp connection, the following method steps are carried out:

Arranging of a crimp holder on the punch holder for attaching a crimp contact of a crimp connection;

Arranging a cable holder on the die holder to attach a cable of the crimp connection;

Transferring a tensile force transmitted from the screw drive via the coupling unit by the crimp holder to the crimp contact to the crimp connection;

Determining the tensile strength of the crimp connection by detecting the tensile force of the crimp holder and/or detecting the adjustment travel of the crimp holder using the sensor unit.

The crimp holder and the die holder are each arranged in the punch holder and the die holder of the handheldable pulling and compressing device, for example, by a workshop employee. The cable of the crimp connection is arranged, in particular fastened, on the die holder and the crimp contact of the crimp connection is arranged, in particular fastened, on the crimp holder. For example, the crimp contact is held on the crimp holder and/or the cable is held on the cable holder in suitable clamping devices or other traction force transmitting means.

To initiate the inspection process, the torque of the electric motor is converted into a tensile force by the screw drive and transmitted from the screw drive to the crimp holder and the crimp contact via the coupling unit. The tensile force acting on the crimp holder and the crimp connection and/or the adjustment travel of the crimp holder is detected by means of the sensor unit. The sensor unit is designed to monitor the adjustment travel of the punch holder, the tensile and compressive forces and/or the torque of the electric motor. The tensile strength of the crimp connection is determined by recording the tensile force and/or the adjustment travel during the inspection process.

By using the handheldable pulling and compressing device, previously necessary transports to and measurements at stationary measuring devices can be dispensed with. The method according to the invention enables simple and reliable quality inspection of crimp connections on site, for example in a workshop.

In principle, any crimp connection, for example previously mounted in a motor vehicle or produced by means of a stationary crimping machine, can be inspected. According to an advantageous further development of the invention, however, it is provided that a crimp connection previously made by means of the handheldable pulling and compressing device is inspected, wherein the crimp holder being arranged in the punch holder instead of a crimping punch and the cable holder being arranged in the die holder instead of a crimping die in order to inspect the crimp connection. A crimp connection is usually a solid and gas-tight connection of the crimp contact with a strand or several strands, i.e. a strand composite, of the cable.

To make the crimp connection, the crimping punch is arranged on the punch holder and the crimping die on the die holder or is arranged, e.g. by a user. A crimping punch is understood here as a tool suitable for deforming the crimp contact and/or the stranded wire. The crimping die describes an anvil designed to center the crimp contact. The cable is stripped manually, e.g. by a user by means of a stripper, or mechanically, for example in a stripping device. The crimp contact is arranged on the crimping die and the exposed stranded wire is positioned on the crimp contact. The positioning of the stranded wire and/or the arrangement of the crimp contact is carried out, for example, by a user and is preferably supported by a positioning element arranged on the die holder.

As soon as the crimp contact and the cable with the stranded wire are arranged on the crimping die, the crimping process is started. For this purpose, the torque of the electric motor is converted into a compressive force by the screw drive and is transmitted to the crimping punch via the coupling unit. The crimping punch is moved in the direction of the longitudinal axis of the punch holder towards the crimping die. The pressure force is transmitted to the crimp contact via the crimping punch and the crimp contact is plastically deformed at least in sections by means of the crimping punch. This produces a firm and gas-tight crimp connection between the crimp contact and the cable.

To inspect the crimp connection made by means of the handheld pulling and compressing device, the crimp holder is then arranged in the punch holder instead of the crimping punch, and the cable holder is arranged in the die holder instead of the crimping die.

By making and inspecting the crimp connection using the handheldable pulling and compressing device, in addition to inspecting the quality of the crimp connection, it is possible to set up the crimping process. Based on the determined tensile strength, a user can, for example, adjust the compressive force used in the crimping process, i.e. the force with which the stranded wire and crimp contact are pressed.

The tensile forces and/or the adjustment travel of the crimp holder detected by means of the sensor unit can, for example, be shown on a display of the handheldable pulling and compressing device and noted by a user to determine the tensile strength of the crimp connection. According to an advantageous further development of the invention, however, it is provided that the tensile strength is determined by means of a control unit connected to the sensor unit and/or by means of a mobile handheld device connected to a communication unit of the handheld pulling and compressing device via a transmitting and receiving unit and/or by means of a server unit connected to the handheld pulling and compressing device or the mobile handheld device via a wireless connection.

To determine the tensile strength, the tensile forces detected by the sensor unit and/or the detected adjustment travel of the punch holder are transmitted to the control unit or preferably via the communication unit to the transmitting and receiving unit of the mobile handheld device and particularly preferably via the wireless connection by means of the transmitting and receiving unit from the mobile handheld device to the server unit. The control unit is connected to the transmitting and receiving unit of the mobile handheld device via the communication unit, for example via a cable or likewise via a wireless connection. The wireless connection between the communication unit and the transmitting and receiving unit or the transmitting and receiving unit and the server unit is made, for example, via Bluetooth, a mobile radio network or via a WLAN connection, for example in a workshop. For example, the tensile strength of the crimp connection is determined by evaluating the tensile forces and/or the adjustment travel in the control unit, the handheld mobile device or the server unit and shown on the display of the handheld pulling and compressing device or a display unit of the handheld mobile device. By determining the tensile strength in the control unit, the mobile handheld device or the server unit, the inspection of the quality of the crimp connection can be further simplified in an advantageous manner.

The tensile force can, for example, be detected by the sensor unit in random or definable time steps and/or time intervals. The tensile strength is determined here, for example, in the control unit, the mobile handheld device or the server unit by extrapolation of the tensile forces determined at the time steps and/or time intervals. According to an advantageous further development of the invention, however, it is provided that the tensile force is recorded over a definable inspection duration and the recorded data is compared with reference data stored in the mobile handheld device or in a database of the server unit in order to inspect the quality of the crimp connection. A definable inspection duration is understood to be a period of time that can be set by means of the control unit and/or the mobile handheld device for recording the tensile force of the punch holder. Preferably, the inspection duration is set as the period of the inspection process. The data recorded during the inspection duration, i.e. the tensile forces at predetermined time steps, e.g. in seconds, and preferably the recorded adjustment travel of the punch holder, are transmitted to the mobile handheld device and/or the server unit. Reference data for comparison with the recorded data is stored in the mobile handheld device or preferably in the database of the server unit. Reference data in this context means recorded tensile forces and/or adjustment travels of the punch holder and/or tensile strengths of qualitative crimp connections. The comparison of the data recorded during the inspection process with the reference data stored in the mobile handheld device or the database of the server unit enables a particularly easy and fast inspection of the quality of the crimp connection.

There are a large number of different crimp contacts available for making a crimp connection, which are basically divided into open and closed crimp contacts. The selection of the appropriate crimp contact for the correct cable thickness has a significant effect on the quality of the crimp connection. For example, the selection of an unsuitable crimp contact may cause it to slip on the cable and thus reduce the quality of the crimp connection. According to an advantageous further embodiment of the invention, it is therefore provided that the cable is identified by means of the handheld mobile device for selecting a crimp contact suitable for making the crimp connection, and information on the suitable crimp contact is shown on the display unit of the handheld mobile device, typically an electronic display.

The cable is identified by a user by means of the mobile handheld device. Based on the identified cable, the server unit communicating with the handheld device via the transmitting and receiving unit selects the crimp contact suitable for making the crimp connection. The information on the suitable crimp contact is displayed on the display unit of the handheld mobile device, for example in the form of written, visual and/or audiovisual instructions, for example as images or videos. The user, e.g. a workshop employee, selects the crimp contact matching the information displayed on the handheld mobile device and arranges it on the crimping die for making the crimp connection with the identified cable. The crimping process described above then begins, in which the workshop employee positively connects the cable to the crimp contact using the handheldable pulling and compressing device. The use of a mobile handheld device enables simple and reliable selection of the appropriate crimp contact.

In principle, the identification of the cable can be carried out in any way, with the user using, for example, the mobile handheld device to display images of different cables, for example different cable thicknesses or cable types, stored in a database on the server unit on the display unit of the mobile handheld device and to match them with the cable intended for making the crimp connection. According to an advantageous further development of the invention, however, it is provided that, for identification of the cable, an electronic image of the cable to be identified is created with a camera unit of the mobile handheld device and the electronic image is transmitted to an evaluation unit of the server unit via the transmitting and receiving unit for identification of the cable in the server unit by comparison with images of cables to be identified stored in the database. The information stored in the database for the identified cable is transmitted to the handheld device for selection of the appropriate crimp contact.

To create the electronic image, the workshop employee points the handheld device with the camera unit at the cable to be identified. Once the electronic image has been created, it is transmitted to the server unit via the transmitting and receiving unit. Within the server unit, the evaluation unit then compares the electronic image with the images stored in the database of the server unit, whereby the data for a matching cable stored in the database, e.g. a product designation of the identified cable, is then in turn transmitted by the server unit to the mobile handheld device for selection of the suitable crimp contact.

The use of the mobile handheld device enables simple and reliable identification of cables. By linking the database to the central server unit, the user can always be provided with up-to-date information by means of a central update of the linked data. Thus, unlike in the case of identification running only locally on the mobile handheld device, it is not necessary to regularly update the information then stored on the handheld device.

The selection of the suitable crimp contact can basically be carried out in any way by means of the mobile handheld device and/or the server unit, whereby a suitable crimp contact is selected, for example, by a manual input of the product designation of the identified cable displayed on the display unit and a comparison with information stored for this cable on the mobile handheld device or the server unit. According to an advantageous further development of the invention, it is provided that the information on the crimp contact suitable for making the crimp connection is stored in the database, the suitable crimp contact is selected on the basis of the identified cable by means of the evaluation unit, and the information is transmitted to the mobile handheld device for display on the display unit. Preferably, the information on the type of suitable crimp contact, for example open or closed, is linked to the electronic images of the cables stored in the database, so that after the cable has been identified by means of the evaluation unit, only the appropriate size of crimp contact is selected for the cable.

As the information for a suitable crimp contact is also stored in the database of the server unit and is preferably linked to the stored electronic images of the cables, a particularly fast and reliable selection of the suitable crimp contact is made possible. After selection by the evaluation unit, the information on the suitable crimp contact is recorded via the transmitting and receiving unit of the mobile handheld device and displayed on the display unit for the user, so that all that is required to select a crimp contact suitable for making a crimp connection to the identified cable is the creation of an electronic image of the cable by means of the mobile handheld device.

The design of the identification of the cable carried out in the evaluation unit can in principle be carried out in any way, whereby various methods for object recognition can be used. According to an advantageous further development of the invention, it is provided that for the identification of the cable in the mobile handheld device or in the evaluation unit, the shape type of the cable and/or at least one object identification of a label arranged on the cable to be identified is determined by an automatic shape detection of the electronic image.

The outer shape of the cable represents the shape type. When determining the geometric shape of the cable, its diameter and/or length can be determined, for example. The object characteristics determined can then be matched with the object characteristics of the electrical images of the cables stored in the database. In addition or alternatively to pattern recognition via the shape type of the cable, the method further provided for an object identification of the cable to be identified to be determined during or before the creation of the electronic image. An object marking may be certain features of the cable to be identified that are independent of the shape, e.g. special markings, embossments and the color design, but also labels or the like applied to the surface. Furthermore, the object identification is preferably formed by a coding arranged on the cable. In addition to a two-dimensional code, such as a barcode or QR code, this can also be a three-dimensional code, which has protruding elevations, for example in the form of dots or bars, and which are particularly advantageously provided with reflective coatings, so that a particularly reliable recognition of this object identification can take place as part of the creation of the electronic image.

Particularly in the case of a combined detection of the shape type and the object marking, the identification of the cable to be identified can be carried out particularly reliably and quickly within the scope of the evaluation unit by comparison with the cables stored in the database, after false recognition can be reduced via an increasing number of matching features.

In addition to the selection of a suitable type of crimp contact, the selection of a suitable size of crimp contact is also crucial for the selection of a suitable crimp contact. For example, the size of the crimp contact for a suitable type may be determined by manually measuring a characteristic dimension of the cable, such as its diameter, and inputting it into the handheld mobile device by the user. Preferably, however, the size of the cable to be identified is determined by means of a sensor unit of the handheld mobile device when the electronic image is created. The sensor unit is designed, for example, as a distance sensor or as a motion sensor. Furthermore, the sensor unit may be designed as a LIDAR. The size of the cable to be identified can also be determined during automatic shape detection by means of several cooperating sensor units of the mobile handheld device. When the electronic image is created, the size of the cable to be identified is determined by means of the sensor unit and transmitted to the server unit for identification of the cable with the electronic image. For the selection of the suitable crimp contact, the determined size of the cable is preferably taken into account in the evaluation unit, so that information about a suitable crimp contact of suitable type and suitable size for display on the display unit is transmitted to the mobile handheld device. By detecting the size of the cable by means of the sensor unit of the mobile handheld device, the risk of incorrect selection of the crimp contact can be reduced.

The comparison with the reference data is basically possible in any way, whereby, for example, one or more values for a tensile strength of a qualitative crimp connection are stored for a specific crimp connection. According to an advantageous further development of the invention, it is further provided that a value corridor is stored as reference data in the database of the server unit, the detected tensile forces in the evaluation unit are compared with the value corridor, and if the detected tensile forces deviate from the value corridor, an error message is displayed on the display unit of the mobile handheld device. A value corridor is understood to be a value range spanned by a lower and an upper limit value. The tensile forces captured during the inspection duration and/or the tensile strength determined are compared with the value corridor by the evaluation unit. As soon as the tensile forces captured and/or the tensile strength of the crimp connection falls below the lower limit value or exceeds the upper limit value, this information is recorded by the transmitting and receiving unit of the mobile handheld device and displayed on the display unit. By comparing the detected tensile forces and/or the determined tensile strength with the reference data stored as a value corridor in the database of the server unit, a particularly fast and reliable inspection of the quality of the crimp connection, which is easy for a user to perform, is made possible in an advantageous manner.

According to an advantageous further development of the invention, it is provided that information on crimping punches, crimping dies, crimp holders and/or cable holders is stored in the database of the server unit or on the mobile handheld device, a suitable crimping punch and a suitable crimping die and/or a suitable crimp holder and a suitable cable holder are selected by means of the identified cable for making and/or inspecting the crimp connection, and the information stored for this purpose is displayed on the display unit of the mobile handheld device. The information on crimping punches and crimping dies is preferably linked to the images of the cables stored in the database, so that when a crimp contact suitable for an identified cable is selected, a suitable crimping punch and a suitable crimping die are also selected for making the crimp connection by means of the handheldable pulling and compressing device. The information stored for the suitable crimping punch and crimping die is displayed on the display unit of the handheld mobile device.

Furthermore, the information on the crimp holders and cable holders is preferably linked to the images of the cables stored in the database. Alternatively or additionally, the information on the crimp holders and cable holders is linked to images of crimp connections stored in the database. In this case, the crimp connection is preferably identified by the user by means of the mobile handheld device as described above for the cable before arranging the crimp holder and the cable holder. Based on the electronic image of the crimp connection, the suitable crimp holder and the suitable cable holder are then selected analogously to the selection of the suitable crimp contact and the information stored for this is displayed on the display unit of the mobile handheld device.

Then the suitable crimping punch and crimping die for making the crimp connection or the suitable crimp holder and cable holder for inspecting the crimp connection are arranged by a user on the handheldable pulling and compressing device. Thereupon, the crimping process or the inspection process begins. The fact that, in addition to the crimp contact, the crimping punch and the crimping die as well as the crimp holder and the cable holder are identified by means of the mobile handheld device and the information on this is displayed to the user on the display unit means that losses in the quality of the crimp connection caused by incorrect tools as well as incorrect measurements during the inspection of the quality of the crimp connection can be counteracted in an advantageous manner.

The inspection process and/or the crimping process can be controlled, for example, by means of the control unit arranged on the handheldable pulling and compressing device and connected to the drive unit. For this purpose, the control unit is preferably designed to control the inspecting and crimping process and/or to archive the inspecting and crimping processes. For example, the control unit can be used to set the tensile and compressive forces provided in each case in a particularly simple manner, so that the inspecting and crimping processes can be carried out particularly reliably. The control unit can also be provided for archiving the inspection and crimping processes performed so that the work performed can be reliably logged.

According to an advantageous further development of the invention, it is further provided that the handheld pulling and compressing device for inspecting and/or making the crimp connection is controlled by means of the control unit, wherein the control unit calls up a program stored in the database of the server unit or on the handheld mobile device for the tools, i.e. the crimping punch and the crimping die or the crimp holder and the cable holder, via the communication unit of the handheld mobile device.

Preferably, the program is stored in the server unit and linked to the electronic images of the cables and/or the crimp connection and/or the information on the suitable tools. The program stored in the server unit is particularly preferably transferred to the mobile handheld device and/or the communication unit of the handheld pulling and compressing device together with the information on the identified cable and/or the identified crimp connection and/or the information on the suitable tools. To control the inspecting or crimping process, the program is executed on the mobile handheld device, for example, so that the respective process is controlled via a permanent connection of the mobile handheld device to the communication unit and the control unit. Preferably, the communication unit has a sufficient memory for at least one, preferably several programs, so that a program stored for suitable tools is transferred directly from the server unit or indirectly via the mobile handheld device to the memory of the communication unit before the start of the machining operation and is stored in it at least for the course of the program. In this way, errors due to connection interruptions can be counteracted. Particularly preferably, the program transmitted from the server unit to the mobile handheld device can be adapted by the user before transmission to the communication unit, so that, for example, a torque for the electric motor that differs from a crimping program can be set or an alternative pressure-actual force can be defined, and the inspection duration can be set for an inspection program.

With the programs stored in the database for various tools, the appropriate inspection and/or crimping program for the suitable tools can be automatically transferred to the mobile handheld device and/or the communication unit of the handheld pulling and compressing device. The manual setting option of the transferred program on the mobile handheld device enables the user to make individual changes.

The system for carrying out a method for producing and/or inspecting the quality of a crimp connection has, in addition to the handheld pulling and compressing device described above, a mobile handheld device with a camera unit, a display unit and a transmitting and receiving unit for wireless data transmission of information to a server unit. Further, the system has at least one crimping punch arrangeable on the punch holder for forming a crimp contact and at least one crimping die arrangeable on the die holder for receiving a cable when making the crimp connection. Furthermore, the system has at least one crimp holder that can be arranged on the punch holder for holding, i.e. preferably positioning in a stationary manner, a crimp contact and at least one cable holder that can be arranged on the die holder for holding a cable during inspection of the crimp connection.

The screw drive of the handheldable pulling and compressing device preferably has a threaded spindle connected to the electric motor and rotatably mounted on a housing body, and a threaded nut rotatably mounted on the threaded spindle and non-rotatably mounted on the housing body via a bearing unit. The coupling unit is connected to the threaded nut in such a way that both tensile and compressive forces resulting from the direction of movement of the threaded spindle and the resulting linear adjustment of the threaded nut are reliably transmitted from the threaded nut via the coupling unit to the tool holder.

In addition, the system is particularly advantageously connected to a server unit, which has a database with stored images of the cables and/or crimp connections to be identified, information on tools and programs for controlling the handheldable pulling and compressing device, and an evaluation unit for identifying the cable in the server unit by comparing the image to be transmitted with the images stored in the database and for selecting a suitable crimp contact or suitable tools.

The handheldable pulling and compressing device enables a user, e.g. in the workshop, to easily and reliably produce and/or inspect the quality of a crimp connection. In addition, the system in conjunction with the mobile handheld device ensures a flexible and mobile selection of a suitable crimp contact for the production as well as suitable tools for the inspection process and the crimping process. The handheld pulling and compressing device and the mobile handheld device are characterized by their high flexibility and usability.

Particularly preferably, the system has a plurality of crimping punches and crimping dies and/or a plurality of crimp holders and cable holders with interchangeable inserts for different cables and/or crimp contacts. The inserts have, for example, different component receptacles, in particular crimp or cable receptacles. A component receptacle is a free area of the insert for arranging the crimp contact and the cable of the crimp connection to be inspected and/or made with the pulling and compressing device. For example, the component receptacles differ in type and size due to different geometries, e.g., a cylindrical geometry for receiving a cable. Different inserts for common cable diameters can be arranged on the crimping die, for example. In addition, the crimping die can preferably be combined with different crimping punches for producing different crimp connections, for example a C-crimp connection or an F-crimp connection.

The plurality of different crimping punches and crimping dies and/or crimp holders and cable holders enables a wide range of applications for the handheld pulling and compressing device. The inserts ensure the use of suitable tools due to the wide coverage of different geometries of different or type-same cables and/or crimp connections for the production and/or inspection of different crimp connections.

The handheld device of the system is preferably designed for manual input of information. This enables the user, for example, to individually adjust the inspecting or crimping program.

Particularly preferably, the mobile handheld device is formed by a tablet or a smartphone. The use of a smartphone is characterized by the fact that these usually already have a display unit, a camera unit and a motion sensor or a distance sensor, so that the creation of the electronic image with the size detection of the cable and/or the crimp connection can then take place using a program application (app) running on the mobile device. During the creation of the electronic image, for example, frame lines or application notes can be displayed on the display unit of the mobile device by the app.

Figure 2:
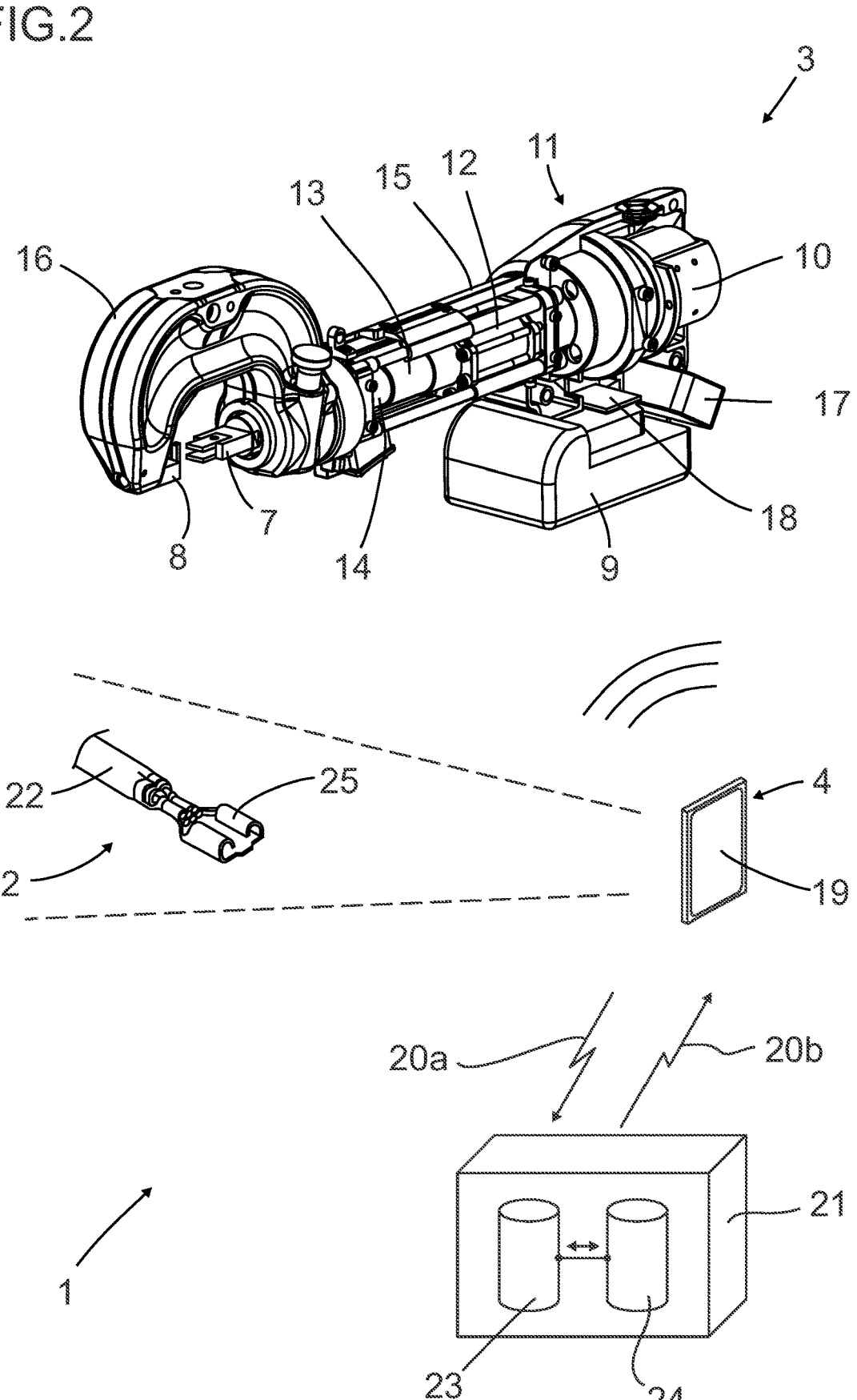

An embodiment of the invention is explained below with reference to the drawings. In the drawings show:

FIG. 1 schematic representation of a system for carrying out a method for producing and inspecting the quality of a crimp connection by means of a handheldable pulling and compressing device comprising a crimping punch and a crimping die, and FIG. 2 schematic representation of the system of FIG. 1 with the handheldable pulling and compressing device having a crimp holder instead of the crimping punch and a cable holder instead of the crimping die.

A system 1 for carrying out a method for producing and inspecting the quality of a crimp connection 2 by means of a handheldable pulling and compressing device 3 is shown schematically in FIG. 1 and FIG. 2. In addition to the handheldable pulling and compressing device 3, the system 1 has a handheld device designed as a smartphone 4 and a plurality of crimping punches 5, crimping dies 6, crimp holders 7 and cable holders 8. FIG. 1 shows an example of a crimping punch 5 and a crimping die 6, and FIG. 2 shows a crimp holder 7 and a cable holder 8.

The handheldable pulling and compressing device 3 has a drive unit 11 comprising an electric motor 10 operated by a rechargeable battery 9 and a screw drive 12 connected to the electric motor 10 for transmitting tensile and compressive forces resulting from the direction of rotation of the electric motor 10 to a coupling unit 13. Furthermore, the pulling and compressing device 3 has a punch holder 14 connected to the coupling unit 13 and a die holder 16 arranged on a housing body 15. The tensile and compressive forces can be transmitted to the punch holder 14 via the coupling unit 13.

A control unit 17 and a sensor unit designed as a force sensor connected to the control unit 17 for detecting the tensile and compressive forces of the punch holder 14 are further arranged on the handheldable pulling and compressing device 3. The control unit 17 is connected to a communication unit 18 for exchanging data with the smartphone 4.

The smartphone 4 has a display unit in the form of an electronic display 19 for displaying information and a transmitting and receiving unit for wireless data transmission 20a, 20b of information to a server unit 21. Furthermore, the smartphone 4 has a camera unit for forming an electronic image of a cable 22 or crimp connection 2 to be identified, and a distance sensor for detecting the size of the cable 22 of the crimp connection 2 or crimp connection 2 when forming the electronic image.

The server unit 21 has a database 23 with stored images of cables 22, crimp connections 2, information on crimping punches 5, crimping dies 6, crimp holders 7 and cable holders 8 as well as crimping and inspection programs for controlling the handheldable pulling and compressing device 2. Further, the server unit 21 has an evaluation unit 24 for identifying the cable 22 or crimp connection 2 in the server unit 18.

To make the crimp connection 2 using the handheldable pulling and compressing device 3, the cable 22 is first identified using the smartphone 4. For this purpose, a user creates an electronic image of the cable 22 using the camera unit of the smartphone 4. The distance sensor of the smartphone 4 determines the size of the cable 2 when creating the electronic image.

The electronic image created in the smartphone 4 is transmitted to the server unit 21 via a wireless connection, for example a mobile radio connection, with the determined size of the cable 22, whereby the data transmission can take place from the smartphone 4 to the server unit and vice versa. Within the server unit 21, the electronic image is analyzed within the evaluation unit 24 and compared with the electronic images of cables 22 stored in the database 23, for example within the scope of a shape detection, in this case of the edge shape of the cable 22.

Information on crimp contacts 25 suitable for making a crimp connection 2 with different cables 22 is linked to the electronic images of the cables 22 stored in the database 23, so that after the cable 22 has been identified by means of the evaluation unit 24, the appropriate size of the crimp contact 25 is determined on the basis of the determined size of the cable 22. In addition, information on crimping punches 5 and crimping dies 6 suitable for machining is stored in each case in the database 23 and is also linked to the stored electronic images, so that a suitable crimping punch 5 and a suitable crimping die 6 are selected by the evaluation unit 24 for the identified cable 22 and the selected crimp contact 25. In addition, a crimping program for controlling the handheldable pulling and compressing device 2 is stored for the selected crimping punch 5 and the selected crimping die 6. For this purpose, the crimping program is retrieved from the server unit 21 via the transmitting and receiving unit of the smartphone 4 together with the information on the identified cable 22, the crimp contact 25 suitable for making the crimp connection 2 with the cable 22, and the information for the suitable crimping punch 5 and the suitable crimping die 6. The crimping program is forwarded to the communication unit 18 connected to the control unit 17, and the above information is displayed on the electronic display 19 of the smartphone 4.

By the user, e.g. a workshop employee, the crimping punch 5 and the crimping die 6, which are suitable for the information displayed on the smartphone 4, are arranged on the punch holder 14 and the die holder 16. The cable 22 is stripped manually by the user using a wire stripper. The crimp contact 25 matching the information displayed on the smartphone 4 is arranged by the user on the crimping die 6, and the exposed stranded wire is positioned by the user on the crimp contact on a positioning element 26 arranged on the die holder 16.

As soon as the crimp contact 25 and the cable 22 with the stranded wire are arranged on the crimping die 6, the crimping process is started. The control unit 17 controls the crimping process by executing the crimping program retrieved from the server unit 21 in response to the signals from the force sensor. The screw drive 12 converts the torque of the electric motor 10 into a compressive force and transmits it to the crimping punch 5 via the coupling unit 13. In the process, the crimping punch 5 is adjusted in the longitudinal axis direction of the punch holder 14 in the direction of the crimping die 6. The compressing force is transmitted to the crimp contact 25 via the crimping punch 5 and the crimp contact 25 is plastically deformed at least in sections by means of the crimping punch 5. This produces a firm and gas-tight crimp connection 2 between the crimp contact 25 and the cable 22.

For the inspection of the quality of the crimp connection 2 made by means of the handheldable pulling and compressing device 3, the crimp holder 7 is then arranged in the punch holder 14 instead of the crimping punch 5, and the cable holder 8 is arranged in the die holder 16 instead of the crimping die 6, as shown in FIG. 2. For the selection of a suitable crimp holder 7 and a suitable cable holder 8, the information on various crimp holders 7 and cable holders 8 stored in the database is linked to the electronic images of the cables 22. The information on a suitable crimp holder 7 and a suitable cable holder 8 for inspecting the crimp connection 2 is also transmitted to the smartphone 4 and displayed on the electronic display 19 for inspection by the user. In addition, a suitable inspection program is retrieved from the server unit 21 via the transmitting and receiving unit of the smartphone 4. The inspection program is forwarded to the communication unit 18 connected to the control unit 21.

The cable 22 of the crimp connection 2 is attached to the cable holder 8 and the crimp contact 25 of the crimp connection 2 is attached to the crimp holder 7.

To initiate the inspection process, the control unit 17 initializes and controls the inspection process by executing the inspection program retrieved from the server unit 21. The torque of the electric motor 10 is converted into a pulling or tensile force by the screw drive 12 and transmitted from the screw drive 12 to the crimp holder 7 and the crimp contact 25 via the coupling unit 13. The tensile force acting on the crimp holder 7 and the crimp connection 2 is recorded by means of the sensor unit throughout the entire inspection process. The determined data, i.e. the detected tensile forces, are transmitted from the communication unit 18 to the server unit 21 via the smartphone 4. In the evaluation unit 24 of the server unit 21, the determined data is compared with reference data in the form of a value corridor. As soon as the determined data deviates from the value corridor, a visual or audiovisual error message is reproduced on the electronic display 19 of the smartphone 4. In the event that the determined data does not deviate from the value corridor over the entire inspection process, corresponding information confirming the sufficient quality of the crimp connection 2 is reproduced on the electronic display 19. By detecting the tensile force during the inspection process, the tensile strength of the crimp connection 2 is determined in the evaluation unit 24 of the server unit 21 and also shown to the user on the electronic display 19.

The method for inspecting the quality of the crimp connection 2 by means of the handheldable pulling and compressing device 3 suitable for producing the crimp connection 2 and the system 1 with the handheldable pulling and compressing device 3 and the smartphone 4 enables simple and reliable quality inspection of crimp connections 2 on site, for example in a workshop.

All features explained in connection with individual embodiments of the invention may be provided in different combinations for the method for producing and inspecting the quality of a crimp connection 2 and/or the system 1 for carrying out the method, in order to realize their beneficial effects, even if they have been described for different embodiments. For example, the handheldable pulling and compressing device 2 can be controlled exclusively by the smartphone 4, with the control unit 17 only performing the inspection or crimping program detected by the transmitting and receiving unit via the communication unit 18.

The scope of protection of the present invention is given by the claims and is not limited by the features explained in the description or shown in the figures.

LIST OF REFERENCE SIGNS

1 System
2 Crimp connection
3 Handheldable pulling and compressing device
4 Mobile handheld device/smartphone
5 Crimping punch
6 Crimping die
7 Crimp holder
8 Cable holder
9 Rechargeable battery
10 Electric motor
11 Drive unit
12 Screw drive
13 Coupling unit
14 Punch holder
15 Housing body
16 Die holder
17 Control unit
18 Communication unit
19 Display unit/electronic display
20a,20b Wireless data transmission
21 Server unit
22 Cable
23 Database
24 Evaluation unit
25 Crimp contact
26 Positioning element

The invention claimed is:

1. Method for inspecting the quality of a crimp connection by means of a handheldable pulling and compressing device suitable for producing the crimp connection with a drive unit 11 comprising a battery-operated electric motor (10), a screw drive (12) connected to the electric motor (10) and arranged in a housing body (15) for transmitting tensile and compressive forces resulting from the direction of rotation of the electric motor (10) to a coupling unit (13), a punch holder (14) connected to the coupling unit (13), a die holder (16) arranged on the housing body (15) and a sensor unit for detecting the tensile and compressive forces and/or the adjustment travel of the punch holder (14), with the steps Arrangement of a crimp holder (7) on the punch holder (14) for attaching a crimp contact (25) of a crimp connection (2);

Arranging a cable holder (8) on the die holder (16) for attaching a cable (22) of the crimp connection (2);

Transferring a tensile force transmitted from the screw drive (12) via the coupling unit (13) through the crimp holder (7) to the crimp contact (25) to the crimp connection (2);

Determining the tensile strength of the crimp connection (2) by detecting the tensile force of the crimp holder (7) and/or detecting the adjustment travel of the crimp holder (7) by means of the sensor unit.

2. The method according to claim 1, characterized in that a crimp connection (2) previously made by means of the handheldable pulling and compressing device (3) is inspected, wherein for inspecting the crimp connection (2) the crimp holder (7) is arranged in the punch holder (14) instead of a crimping punch (5) and the cable holder (8) is arranged in the die holder (16) instead of a crimping die (6).

3. Method according to claim 1, characterized in that the tensile strength is determined by means of a control unit (17)

connected to the sensor unit and/or by means of a mobile handheld device (4) connected to a communication unit (18) of the handheld pulling and compressing device (3) via a transmitting and receiving unit and/or by means of a server unit (21) connected to the handheld pulling and compressing device (3) or the mobile handheld device (4) via a wireless connection.

4. Method according to claim 1, characterized in that the tensile force and/or the adjustment travel is recorded over a definable inspection duration and the recorded data is compared with reference data stored in the mobile handheld device (4) or in a database (23) of the server unit (21) in order to inspect the quality of the crimp connection (2).

5. Method according to claim 1, characterized in that the cable (22) for selecting a crimp contact (25) suitable for producing the crimp connection (2) is identified by means of the mobile handheld device (4) and information on the suitable crimp contact (25) is displayed on a display unit (19) of the mobile handheld device (4).

6. Method according to claim 1, characterized in that for identification of the cable (22)

an electronic image of the cable (22) to be identified is created with a camera unit of the mobile handheld device (4), the electronic image is transmitted to an evaluation unit (24) of the server unit (21) via the transmitting and receiving unit for identifying the cable (22) in the server unit (21) by comparison with images of cables (22) to be identified stored in the database (23), and the information stored for the identified cable (22) in the database (23) is transmitted to the handheld device (4) for selection of the suitable crimp contact (25).

7. Method according to claim 1, characterized in that the information on the crimp contact (25) suitable for producing the crimp connection (2) is stored in the database, the suitable crimp contact (25) is selected on the basis of the identified cable (22) by means of the evaluation unit (24), and the information is transmitted to the mobile handheld device (4) for display on the display unit (19).

8. Method according to claim 1, characterized in that for identification of the cable (22) in the mobile handheld device (4) or in the evaluation unit (24), the shape type of the cable (22) and/or at least one object marking of a label arranged on the cable (22) to be identified is determined by automatic shape detection of the electronic image.

9. Method according to claim 1, characterized in that a value corridor is stored as reference data in the database (23) of the server unit (21), the detected tensile forces and/or the adjustment travel in the evaluation unit (24) are compared with the value corridor, and if the detected tensile forces and/or the adjustment travel deviate from the value corridor, an error message is displayed on the display unit (19) of the mobile handheld device (4).

10. Method according to claim 1, characterized in that information on crimping punches (5), crimping dies (6), crimp holders (7) and/or cable holders (8) is stored in the database (23) of the server unit (21) or on the mobile handheld device (4), a suitable crimping punch (5) and a suitable crimping die (6) and/or a suitable crimp holder (7) and a suitable cable holder (8) are selected by means of the identified cable (22) for the production and/or inspection of the crimp connection (2), and the information stored for this purpose is displayed on the display unit (19) of the mobile handheld device (4).

11. Handheldable pulling and compressing device for carrying out a method for inspecting the quality of a crimp connection, in particular according to claim 1, comprising a drive unit (11) comprising a battery operated electric motor (10), a screw drive (12) connected to the electric motor (10) and arranged in a housing body (15) for transmitting tensile and compressive forces resulting from the direction of rotation of the electric motor (10) to a coupling unit (13), a punch holder (14) connected to the coupling unit (13), a die holder (16) arranged on the housing body (15), and a sensor unit for detecting the tensile and compressive forces and/or the adjustment travel of the punch holder (14).

12. System for carrying out a method for producing and/or inspecting the quality of a crimp connection, comprising a handheldable pulling and compressing device (3) according to claim 11, a mobile handheld device (4) with a camera unit, a display unit (19) and a transmitting and receiving unit for wireless data transmission of information to a server unit (21), and at least one crimping punch (5), which can be arranged on the punch holder (14) of the handheldable pulling and compressing device (3), for forming a crimp contact (25) when producing the crimp connection (2), at least one crimping die (6), which can be arranged on the die holder (16) of the handheldable pulling and compressing device (2), for receiving a cable (22) during the production of the crimp connection (2), at least one crimp holder (7), which can be arranged on the punch holder (14), for holding a crimp contact (25) during inspection of the crimp connection (2), at least one cable holder (8), which can be arranged on the die holder (16), for holding a cable (22) during inspection of the crimp connection (2).

13. System according to claim 12, characterized by a plurality of crimping punches (5) and crimping dies (6) and/or a plurality of crimp holders (7) and cable holders (8) with interchangeable inserts for different cables (22) and/or crimp contacts (25).

\* \* \* \* \*